(12) United States Patent
Mochizuki

(10) Patent No.: US 9,113,174 B2
(45) Date of Patent: Aug. 18, 2015

(54) PREDICTIVE CODING APPARATUS, CONTROL METHOD THEREOF, AND COMPUTER PROGRAM

(75) Inventor: Shigeki Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 13/179,616

(22) Filed: Jul. 11, 2011

(65) Prior Publication Data

US 2012/0027086 A1    Feb. 2, 2012

(30) Foreign Application Priority Data

Jul. 30, 2010   (JP) .................................. 2010-172727
Jun. 24, 2011   (JP) .................................. 2011-141221

(51) Int. Cl.
| H04N 7/32 | (2006.01) |
|---|---|
| H04N 19/61 | (2014.01) |
| H04N 19/70 | (2014.01) |
| H04N 19/13 | (2014.01) |

(52) U.S. Cl.
CPC .............. *H04N 19/61* (2014.11); *H04N 19/13* (2014.11); *H04N 19/70* (2014.11)

(58) Field of Classification Search
None
See application file for complete search history.

(56) References Cited

U.S. PATENT DOCUMENTS

| 7,228,001 B2 | 6/2007 | Kobayashi et al. |
|---|---|---|
| 7,251,371 B2 | 7/2007 | Kobayashi et al. |
| 7,336,711 B2 | 2/2008 | Kobayashi et al. |
| 7,646,816 B2 | 1/2010 | Ribas-Corbera et al. |
| 7,860,160 B2 | 12/2010 | Shimazaki et al. |
| 8,102,911 B2 | 1/2012 | Arakawa et al. |
| 2003/0053416 A1 | 3/2003 | Ribas-Corbera et al. |
| 2004/0091049 A1* | 5/2004 | Yamaguchi et al. ..... 375/240.16 |
| 2004/0131269 A1 | 7/2004 | Kobayashi et al. |
| 2004/0131272 A1 | 7/2004 | Kobayashi et al. |

(Continued)

FOREIGN PATENT DOCUMENTS

| CN | 1426235 A | 6/2003 |
|---|---|---|
| CN | 1529988 A | 9/2004 |

(Continued)

OTHER PUBLICATIONS

Overview of the H.264/AVC Video Coding Standard, Thomas Wiegand et al., IEEE Transactions on Circuits and Systems for Video Technology, vol. 13, No. 7, Jul. 2003.*

(Continued)

*Primary Examiner* — Sath V Perungavoor
*Assistant Examiner* — Janese Duley
(74) *Attorney, Agent, or Firm* — Cowan, Liebowitz & Latman, P.C.

(57) ABSTRACT

A predictive coding apparatus which performs predictive coding for each picture forming a moving picture, comprising: a prediction processing unit configured to perform prediction processing for each predetermined block unit of a picture to be coded, a transformation unit adapted to orthogonally transform and quantize a result of the prediction processing by the prediction processing unit to generate multi-valued data, a binarization unit configured to convert the multi-valued data into binary data, a detection unit configured to detect an amount of the binary data, a coding unit configured to perform arithmetically coding of the binary data to create coded data, and a multiplexing unit configured to multiplex, onto the coded data, information indicating the amount of the binary data detected by the detection unit to generate a coded data stream.

11 Claims, 10 Drawing Sheets

(56) References Cited

U.S. PATENT DOCUMENTS

| | | |
|---|---|---|
| 2004/0179601 A1 | 9/2004 | Kobayashi et al. |
| 2006/0280371 A1 | 12/2006 | Shimazaki et al. |
| 2007/0116246 A1* | 5/2007 | Walker et al. ............ 379/355.02 |
| 2007/0171977 A1 | 7/2007 | Kudo et al. |
| 2007/0280353 A1 | 12/2007 | Arakawa et al. |
| 2008/0012738 A1* | 1/2008 | Seki et al. ....................... 341/51 |
| 2008/0013620 A1* | 1/2008 | Hannuksela et al. .... 375/240.01 |
| 2010/0208754 A1* | 8/2010 | Wiegand ........................ 370/476 |
| 2011/0002397 A1* | 1/2011 | Wang et al. ............. 375/240.26 |

FOREIGN PATENT DOCUMENTS

| | | |
|---|---|---|
| CN | 1547854 A | 11/2004 |
| CN | 1633811 A | 6/2005 |
| CN | 101087417 A | 12/2007 |
| EP | 0852445 A2 | 7/1998 |
| JP | 2007-020141 | 1/2007 |

OTHER PUBLICATIONS

ITU Series H: Audiovisual and Multimedia Systems, Infrastructure of audiovisual services—Coding of moving video, Advanced video coding for generic audiovisual services, May 2003, (AVC).*

Aug. 5, 2013 Chinese Office Action, that issued in Chinese Patent Application No. 201110216359.9.

Apr. 28, 2014 Chinese Office Action, that issued in Chinese Patent Application No. 201110216359.9.

* cited by examiner

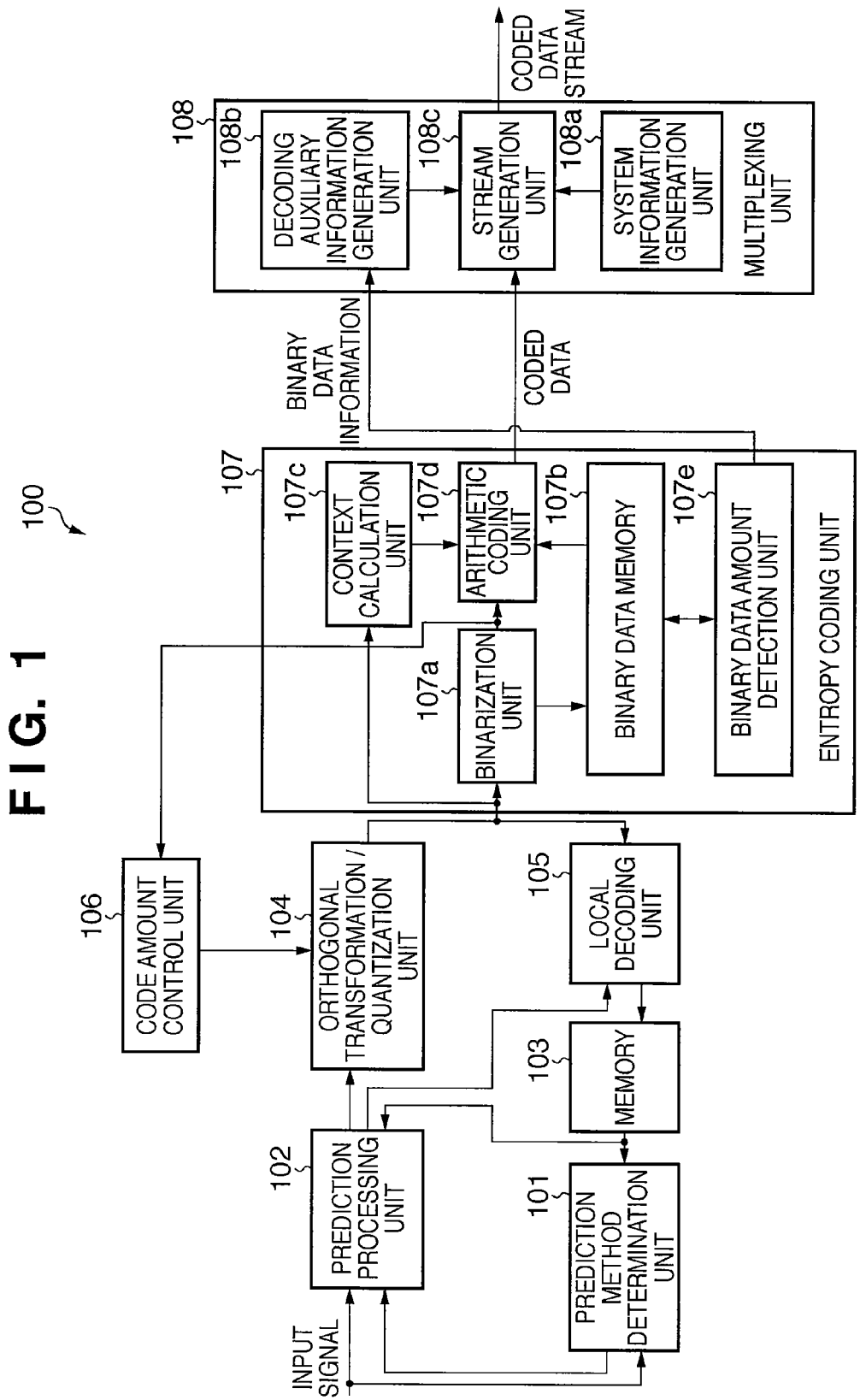

FIG. 2A

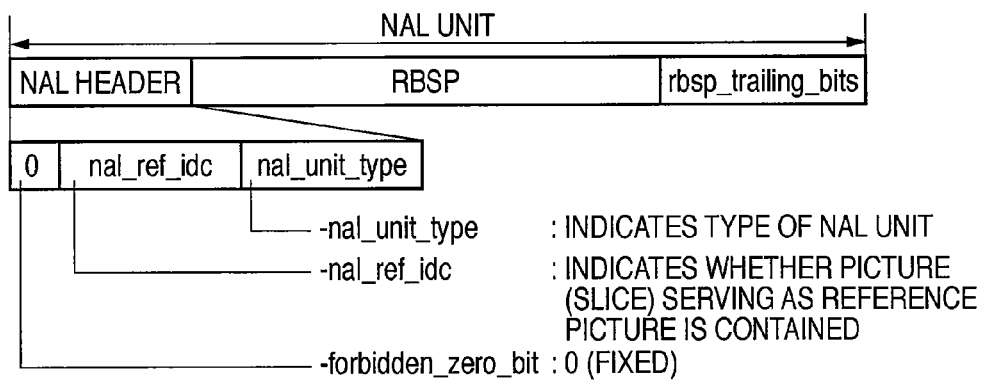

FIG. 2B

| nal_unit_type | CONTENTS OF NAL UNIT AND RBSP SYNTAX STRUCTURE |
|---|---|
| 0 | Unspecified |
| 1 | Coded slice of a non-IDR picture |
| 2 | Coded slice data partiton A |
| 3 | Coded slice data partiton B |
| 4 | Coded slice data partiton C |
| 5 | Coded slice of an IDR picture |
| 6 | Supplemental enhancement informaition (SEI) |
| 7 | Sequence parameter set (SPS) |
| 8 | Picture parameter set (PPS) |
| 9 | Access unit delimiter |
| 10 | End of sequence |
| 11 | End of stream |
| 12 | Filler data |
| 13 | Sequence parameter set extension |
| 14..18 | Reserved |
| 19 | Coded slice of an auxiliary coded picture without partitioning |
| 20..23 | Reserved |
| 24..31 | Unspecified |

FIG. 3A

```
user_data_unregistered(payloadSize) {
    uuid_iso_iec_11578                          u(128)
    for(i=16; i<payloadSize; i++)
        user_data_payload_byte                  b(8)
}
```

※ u(128) :unsigned interger 128 bits
※ b(8)   :byte

FIG. 3B

```
bin_info( ) {
    pic_pos                                     u(32)
    num_slice                                   u(8)
    for(i=0; i<num_slice; i++) {
        bin_size[ i ]                           u(32)
    }
}
```

- num_slice : NUMBER OF SLICES IN PICTURE
- pic_pos   : PICTURE POSITION CORRESPONDING TO bin_info
              (NUMBER OF PICTURES IN CODING ORDER FROM START OF SEQUENCE)
- bin_size  : BINARY DATA AMOUNT (kbits) OF EACH SLICE ※ u(8)  :unsigned interger 8 bits
※ u(32) :unsigned interger 32 bits

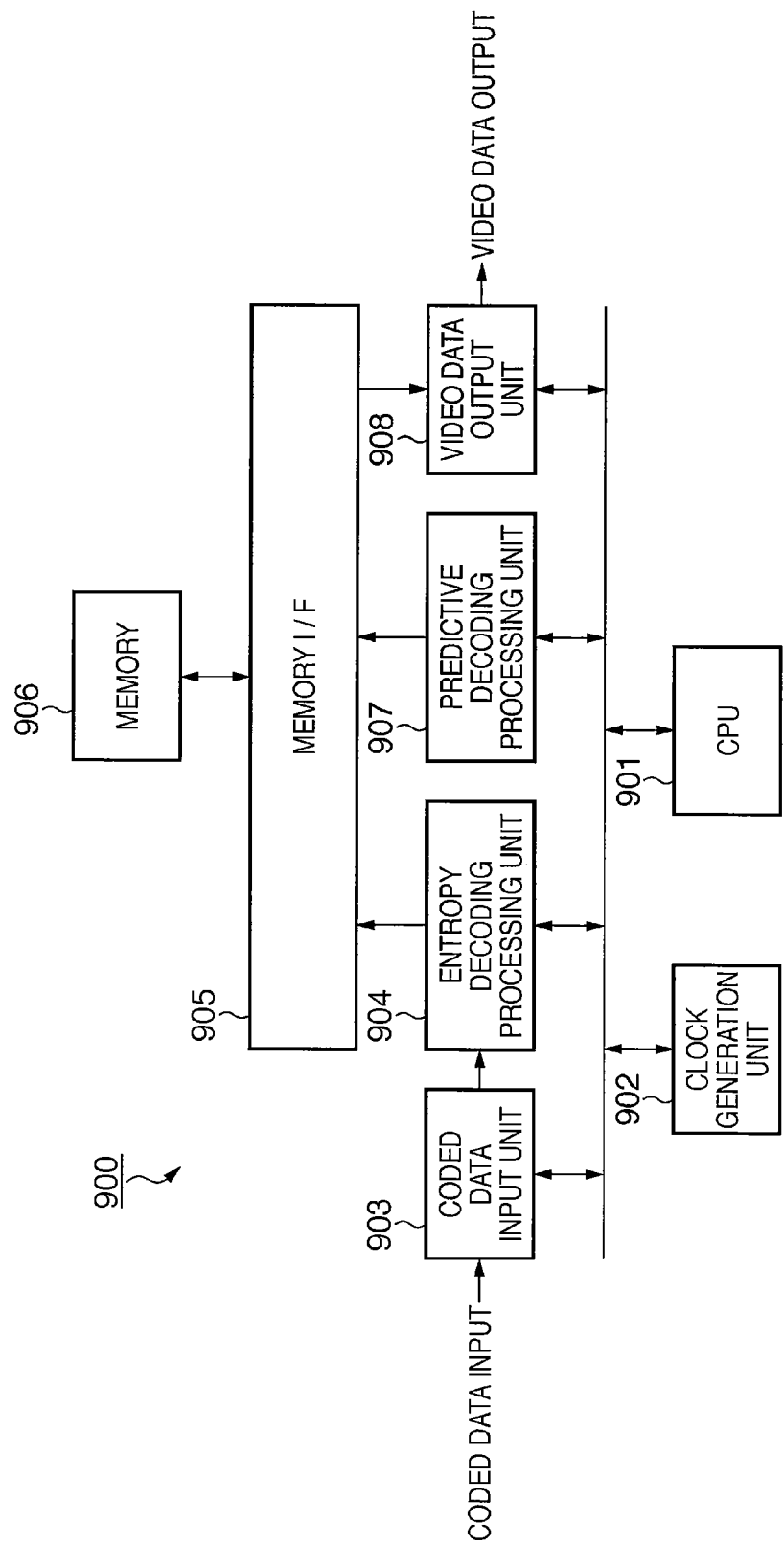

PREDICTIVE CODING APPARATUS, CONTROL METHOD THEREOF, AND COMPUTER PROGRAM

BACKGROUND OF THE INVENTION

1. Field of the Invention

The present invention relates to a predictive coding apparatus, control method thereof, and a computer program.

2. Description of the Related Art

An example of a moving picture coding schemes is MPEG-4 AVC: ISO/IEC 14496-10, also known as H.264 (to be referred to as MPEG-4 AVC), which is employed in digital television broadcasting and video recording media. MPEG-4 AVC adopts the following two context-based entropy coding schemes to increase coding efficiency, compared to conventional entropy coding schemes:

Context-based Adaptive Variable Length Coding (CAVLC)
    Context-based Adaptive Binary Arithmetic Coding (CABAC)

Of these schemes, CABAC performs arithmetic coding as follows. Binarization processing is done for data to be coded to calculate the probability of occurrence of binary data (bin) in accordance with the context (current coding target and surrounding circumstances). The calculation result is then set as coded data. The length of binary data output by binarization processing varies depending on a video signal input to a coding apparatus as well as coding conditions. As such, it is recognized that an enormous amount of binary data may be generated due to its property. CABAC has problems such as a fear about assurance of real-time arithmetic coding processing for binary data, and inability of deciding in advance a memory area to store generated binary data.

To solve these problems, there is a proposed method for suppressing the binary data amount in coding. Japanese Patent Laid-Open No. 2007-020141 proposes a method for subtracting an offset value from an orthogonally transformed value and then quantizing the value in order to reduce the amount of binary data generated by binarization processing so that it becomes smaller than that of binary data generated by original binarization processing. Japanese Patent Laid-Open No. 2007-020141 proposes even a method for selecting a motion vector which reduces the binary data amount, compared to coding with a motion vector which provides the smallest evaluation value in motion vector detection.

SUMMARY OF THE INVENTION

However, the proposed methods may degrade the picture quality under original coding conditions due to the following two points:

1) Processing is done for a transformation coefficient value after orthogonal transformation that has been coded under coding conditions to be originally applied.

2) A motion vector is applied, which reduces the binary data amount compared to coding with a motion vector which minimizes the evaluation value.

Considering decoding processing, the binary data amount is the information obtained after arithmetic decoding processing. Therefore, a redundant memory area larger than an actually generated binary data amount needs to be prepared assuming the worst case. If a memory area of a limited size is assigned without taking account of the worst case, the memory area may overflow, and decoding processing may fail.

Demand has arisen for a technique capable of preventing a failure of decoding processing caused by overflow of the binary memory area by arranging an optimum binary memory area before arithmetic decoding in a decoding apparatus to omit a redundant memory area without degrading the picture quality in coding.

According to one aspect of embodiments, the present invention relates to a predictive coding apparatus which performs predictive coding for each picture forming a moving picture, comprising, a prediction processing unit configured to perform prediction processing for each predetermined block unit of a picture to be coded, a transformation unit adapted to orthogonally transform and quantize a result of the prediction processing by the prediction processing unit to generate multi-valued data, a binarization unit configured to convert the multi-valued data into binary data, a detection unit configured to detect an amount of the binary data, a coding unit configured to perform arithmetically coding of the binary data to create coded data, and, a multiplexing unit configured to multiplex, onto the coded data, information indicating the amount of the binary data detected by the detection unit to generate a coded data stream.

According to another aspect of embodiments, the present invention relates to a method for controlling a predictive coding apparatus which performs predictive coding for each picture forming a moving picture, comprising, a prediction processing step for performing prediction processing for each predetermined block unit of a picture to be coded, a transformation step for orthogonally transforming and quantizing a result of the prediction processing in the prediction processing step to generate multi-valued data, a binarization step for converting the multi-valued data into binary data, a detection step for detecting an amount of the binary data, a coding step for arithmetically coding the binary data to generate coded data, and, a multiplexing step for multiplexing, onto the coded data, information indicating the amount of the binary data detected in the detection step to generate a coded data stream.

Further features of the present invention will become apparent from the following description of exemplary embodiments (with reference to the attached drawings).

BRIEF DESCRIPTION OF THE DRAWINGS

FIG. 1 is a block diagram exemplifying the arrangement of a predictive coding apparatus according to an embodiment;

FIGS. 2A to 2C are views showing the structures of an NAL unit and access unit;

FIGS. 3A and 3B are views for explaining the syntax of "bin_info SEI";

FIG. 9 is a block diagram exemplifying the arrangement of a decoding apparatus according to the embodiment.

DESCRIPTION OF THE EMBODIMENTS

Figure 2C:
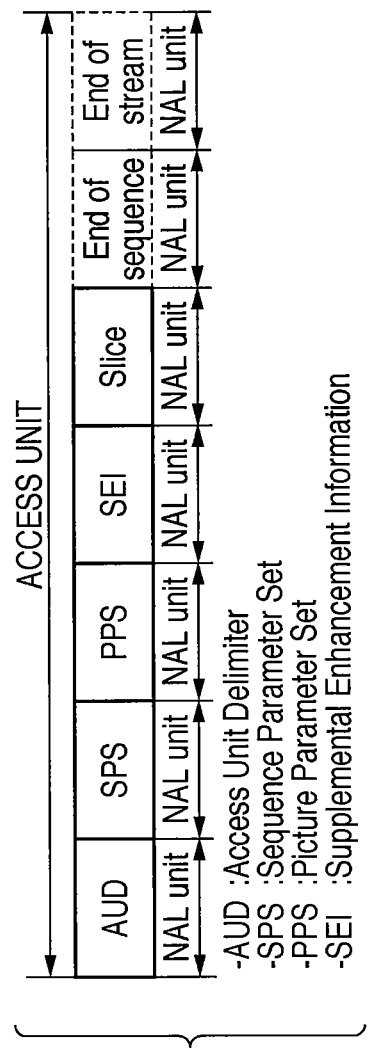

Embodiments of the present invention will be described below with reference to the accompanying drawings.

[First Embodiment]

The arrangement and processing sequence of a predictive coding apparatus according to the first embodiment of the present invention that predictively codes each picture forming a moving picture by, for example, the MPEG-4 AVC (ISO/IEC 14496-10) scheme will be described with reference to the block diagram of FIG. 1. A predictive coding apparatus 100 according to the first embodiment processes each block unit (for example, macroblock unit) obtained by dividing a picture to be coded into blocks each of, for example, 8×8 pixels or 16×16 pixels. In the predictive coding apparatus 100 of the FIG. 1, each block may be formed as hardware using a dedicated logic circuit or memory or as software by executing a processing program stored in the memory by the CPU.

A prediction method determination unit 101 is a processing unit which determines a prediction method for each macroblock within a picture to be coded. The prediction method determination unit 101 executes simple intra-frame prediction or inter-frame prediction including motion detection by using an input picture to be coded and a coded picture read out from a memory 103 which stores coded pictures, thereby calculating an evaluation value indicating coding efficiency. Then, the prediction method determination unit 101 determines a prediction method which optimizes the calculated coding efficiency. When the macroblock to be coded is an I-slice, the prediction method determination unit 101 determines a prediction pixel block size and prediction mode. When the macroblock is a P- or B-slice, the prediction method determination unit 101 selects prediction with higher coding efficiency from intra-frame prediction and inter-frame prediction. For intra-frame prediction, the prediction method determination unit 101 determines intra-frame prediction coding parameters such as an intra-frame prediction pixel block size and intra-frame prediction mode. For inter-frame prediction, the prediction method determination unit 101 determines inter-frame prediction coding parameters such as a reference picture frame, macroblock division pattern, and motion vector.

A prediction processing unit 102 generates a predicted picture from coded pictures read out from the memory 103 in accordance with predictive coding parameters designated by the prediction method determination unit 101. The prediction processing unit 102 outputs the predicted picture to a local decoding unit 105. Further, the prediction processing unit 102 generates a prediction residual signal serving as the difference between the macroblock to be coded and the predicted picture, and outputs it to an orthogonal transformation/quantization unit 104.

The orthogonal transformation/quantization unit 104 executes orthogonal transformation processing based on integer discrete cosine transformation and discrete Hadamard transformation for each designated pixel block unit (each block unit of, for example, 8×8 pixels or 4×4 pixels). Discrete Hadamard transformation is done for only the DC (Direct Current) component of the result of executing integer discrete cosine transformation for each pixel block with respect to a luminance signal or color difference signal having undergone intra-frame prediction processing for each 16×16 pixel block unit. A code amount control unit 106 (to be described later) quantizes the transformation coefficient after orthogonal transformation at a quantization step corresponding to a designated quantization parameter. The quantized data is output to an entropy coding unit 107.

The quantized data is simultaneously input to the local decoding unit 105. The local decoding unit 105 performs inverse quantization processing and inverse orthogonal transformation processing (inverse discrete Hadamard transformation and inverse integer discrete cosine transformation) for the quantized data. The local decoding unit 105 adds the predicted picture input from the prediction processing unit 102 to the obtained data, and performs decoding processing. The memory 103 holds the decoded data. The decoded data held in the memory 103 is used for subsequent intra-frame prediction processing. Further, the memory 103 holds decoded data having undergone deblocking filter processing. The decoded data held in the memory 103 after deblocking filter processing is used for subsequent inter-frame prediction processing.

The entropy coding unit 107 is a processing unit which performs entropy coding processing by CABAC (Context-based Adaptive Binary Arithmetic Coding) for each slice of input data. In the entropy coding unit 107, a binarization unit 107a converts input multi-valued data into binary data. A binary data memory 107b stores the binary data generated by the binarization unit 107a. A context calculation unit 107c calculates and holds the probability of occurrence of binary data in accordance with the context. An arithmetic coding unit 107d performs arithmetic coding in accordance with the probability of occurrence supplied from the context calculation unit 107c. A binary data amount detection unit 107e detects the amount of binary data generated for each slice by counting the binary data generated by the binarization unit 107a and stored in the binary data memory 107b.

Data coded by the arithmetic coding unit 107d, and information (binary data information) indicating a binary data amount detected by the binary data amount detection unit 107e are supplied to a multiplexing unit 108 for each picture. Note that the binary data information includes the picture count in the coding order from the start of the picture sequence, information "ref_pic_flag" indicating whether the picture to be coded is a reference picture, and information indicating the number of slices forming a picture and the binary data amount in each slice. Whether the picture to be coded is a reference picture means whether it has been used to perform motion compensation predictive coding for another picture to be coded. This information is obtained from the prediction method determination unit 101.

The code amount control unit 106 is a processing unit which controls the code amount of coded data to prevent overflow or underflow of a coded picture buffer (CPB). The code amount control unit 106 generates a quantization parameter based on a generated code amount supplied from the entropy coding unit 107 after entropy coding, and supplies it to the orthogonal transformation/quantization unit 104.

The multiplexing unit 108 outputs a generated coded stream as coded data. In the multiplexing unit 108, a system information generation unit 108a generates system information about coded data. A decoding auxiliary information generation unit 108b generates decoding auxiliary information as additional information to coded data. A stream generation unit 108c packetizes the generated system information, decoding auxiliary information, and coded data in a predetermined unit, and outputs them as a coded data stream. These processing units build the predictive coding apparatus 100.

In the above arrangement, binary data generated by the binarization unit 107a of the entropy coding unit 107 is an intermediate coded data generated during entropy coding. The binary data memory 107b is required to store the data. Even considering the decoding apparatus, binary data is generated as intermediate coded data after arithmetic decoding, so a binary data memory is needed.

However, the amount of generated intermediate binary data cannot be obtained from final coded data. The decoding apparatus knows the binary data generation amount only after the completion of arithmetic decoding for each coding unit (slice). It is therefore very difficult to ensure an optimum binary data memory corresponding to an actually generated binary data amount before arithmetic decoding. Hence, a binary data memory assuming the worst case scenario needs to be ensured in advance.

In the first embodiment, to obtain the binary data amount before decoding in the decoding apparatus, the multiplexing unit 108 multiplexes, as decoding auxiliary information onto coded data, information about binary data supplied from the entropy coding unit 107.

Decoding auxiliary information generated by the decoding auxiliary information generation unit 108*b* will be explained. MPEG-4 AVC is considered to be used in various networks, and defines the following two layers:

Video Coding Layer (VCL) which handles video coding processing

Network Abstraction Layer (NAL) with an actual transmission/storage system

Of these layers, the NAL is packetized for each NAL unit made up of an NAL header and RBSP (Row Byte Sequence Payload), as shown in FIG. 2A. The NAL header is used to identify the type of NAL unit (nal_unit_type) and determine whether the picture to be coded is a reference picture (nal_ref_idc). The picture is not a reference picture for a nal_ref_idc value "00" and is a reference picture for other nal_ref_idc values. The RBSP stores the entity of coded data. The type of NAL unit is shown in FIG. 2B, identified based on an identification number nal_unit_type, and includes the following:

video coded data (slice)

SPS (Sequence Parameter Set) as information about a video coded data sequence

PPS (Picture Parameter Set) as information about a video coded data picture

SEI (Supplemental Enhancement Information) as additional information of video coded data A combined unit of these NAL units for each picture will be called an access unit. As shown in FIG. 2C, the access unit starts from an NAL unit called AUD (Access Unit Delimiter) containing information capable of identifying a picture type in the access unit. NAL units necessary for a picture, such as SPS, PPS, and slice data, follow AUD. Of these NAL units, SPS and PPS are generated by the system information generation unit 108*a*, and SEI is generated by the decoding auxiliary information generation unit 108*b*. The stream generation unit 108*c* generates the access unit.

The multiplexing unit 108 generates decoding auxiliary information as SEI from binary data information received from the entropy coding unit 107 for each picture. For SEI, "user data SEI" capable of using a user-defined syntax is prepared. For "user data SEI", two types "user data unregistered SEI" and "user registered by ITU-T Recommendation T.35 SEI" are defined. FIG. 3A shows the syntax of "user data unregistered SEI" on the assumption that decoding auxiliary information is multiplexed using "user data unregistered SEI".

Of syntax elements in FIG. 3A, the "user_data_payload_byte" area can store binary data information. The storage of binary data information in "user data unregistered SEI" can be identified by the QUID in the "uuid_iso_iec_11578" area. Binary data information to be stored in the "user_data_payload_byte" area will be called "bin_info", and its SEI will be called "bin_info SEI". FIG. 3B shows the definition of this syntax.

pic_pos is an information indicating a picture position corresponding to "bin_info", and stores the picture count in the coding order (decoding order in the decoding apparatus) from the start of the sequence. num_slice indicates the number of slices forming a picture. Subsequently, the binary data amount (kbits) of each slice corresponding to the number of slices indicated by num_slice is stored as bin_size. Note that the binary data amount may be stored as the data amount of each picture.

According to the above syntax, the decoding auxiliary information generation unit 108*b* generates the above-mentioned "bin_info SEI" based on binary data information received from the entropy coding unit 107. The stream generation unit 108*c* multiplexes "bin_info SEI" onto the access unit.

Figure 4A:
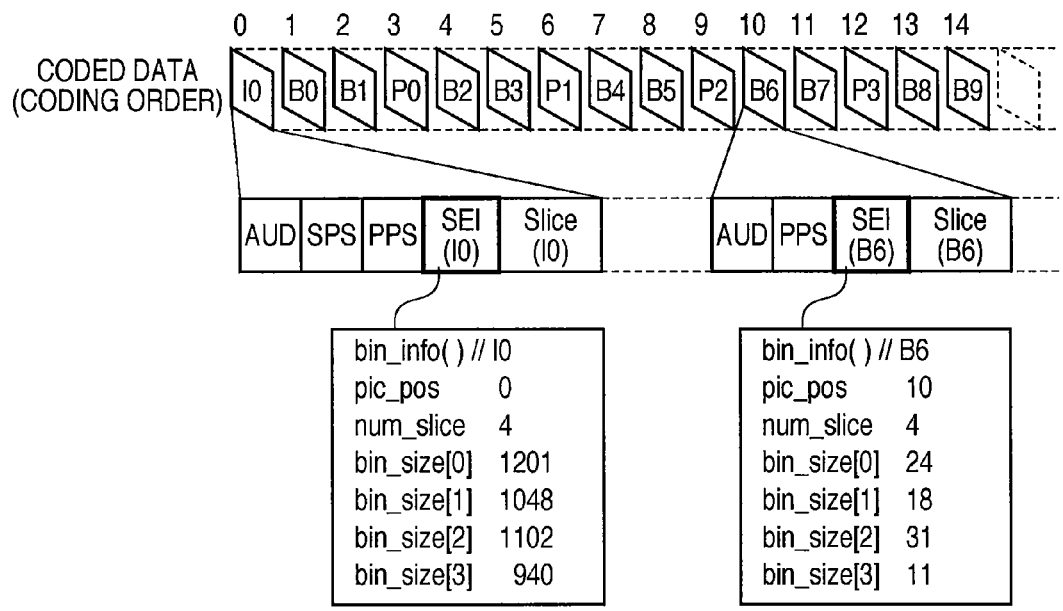
FIGS. 4A and 4B are views exemplifying "bin_info SEI"-multiplexed coded data.
Figure 4B:
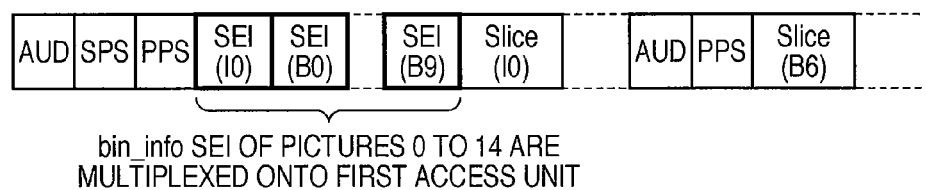

FIGS. 4A and 4B exemplify coded data obtained by coding four slices per "bin_info SEI"-multiplexed picture. FIG. 4A shows an example of multiplexing "bin_info SEI" on each picture. FIG. 4A shows the contents of SEIs added to respective typical pictures I0 and B6. Picture I0 is the first picture in the coding order, and pic_pos=0. Since one picture is coded for four slices, num_slice=4. After that, the binary data amounts bin_size[0] to bin_size[3] of the respective slices contained in the picture are stored for the four slices.

Picture B6 is the 11th picture in the coding order, and pic_pos=10. Since picture B6 is coded for four slices, similar to picture I0, num_slice=4. Also, the binary data amounts bin_size[0] to bin_size[3] of the respective slices are stored for the four slices. FIG. 4A shows an example of multiplexing "bin_info SEI" onto each access unit. However, the SEIs of respective pictures in a coded data stream may be multiplexed at once onto the access unit of a predetermined picture at the start of the coded data stream, as shown in FIG. 4B. For example, "bin_info SEI"s of a plurality of pictures (for example, for one GOP or one moving picture file) may be multiplexed at once onto the access unit of an I-picture at the start of a coded data stream. This multiplexing allows the decoding apparatus to easily acquire "bin_info SEI"s of a plurality of pictures in advance.

"bin_info SEI" multiplexed in the above way is effective in the following case in the decoding apparatus.

Figure 5A:
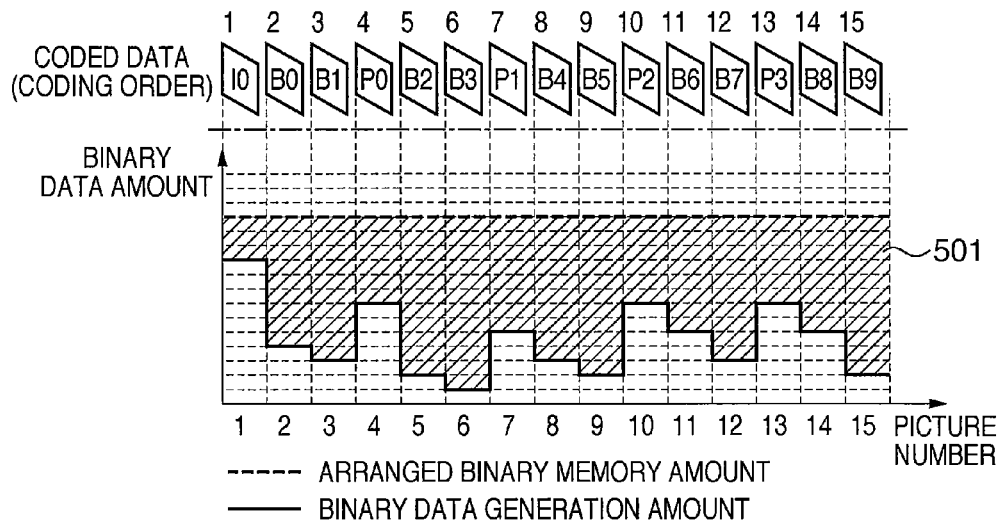
FIGS. 5A and 5B are graphs exemplifying decoding processing using "bin_info SEI"
Figure 5B:
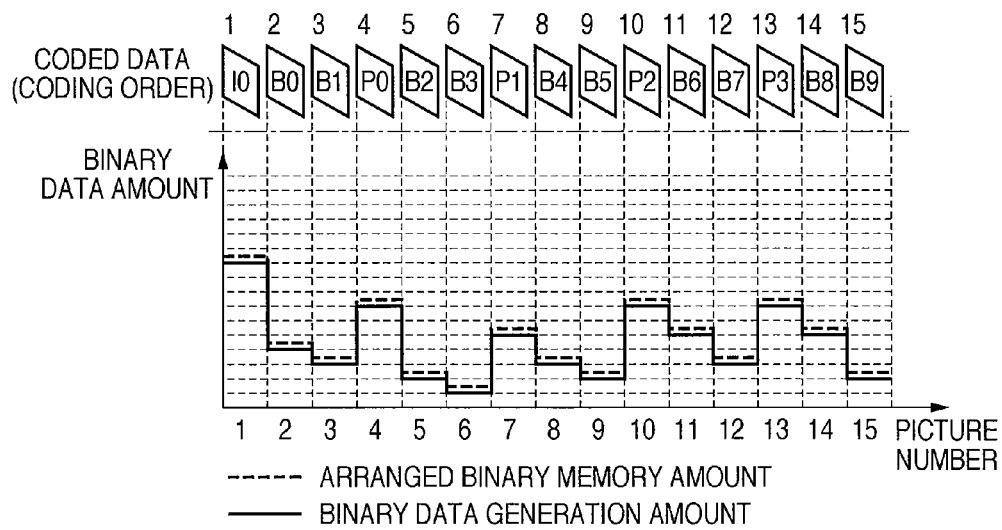

Considering a decoding apparatus having a mechanism capable of dynamically arranging a binary data memory area in a shared memory, the binary data memory area may be arranged by taking account of an upper limit binary data generation amount defined by the MPEG-4 AVC standard. However, the frequency at which the generated binary data amount comes close to the upper limit defined by the standard is low, and in most cases, a redundant memory area is considered to be assigned as the binary data memory area in decoding processing. For example, assume that the binary data amount of each picture in coded data changes as represented by a graph shown in FIG. 5A, and the decoding apparatus has a memory area of a size indicated by the broken line in the graph. In this case, a hatched area 501 in the graph becomes a redundant memory area not used during decoding in the decoding apparatus. However, the change of the binary data amount represented by the graph can be determined using "bin_info SEI", so an optimum binary memory area can be arranged in correspondence with each picture, as shown in FIG. 5B. As a result, a blank area can be effectively utilized without arranging a redundant memory area.

Figure 6A:
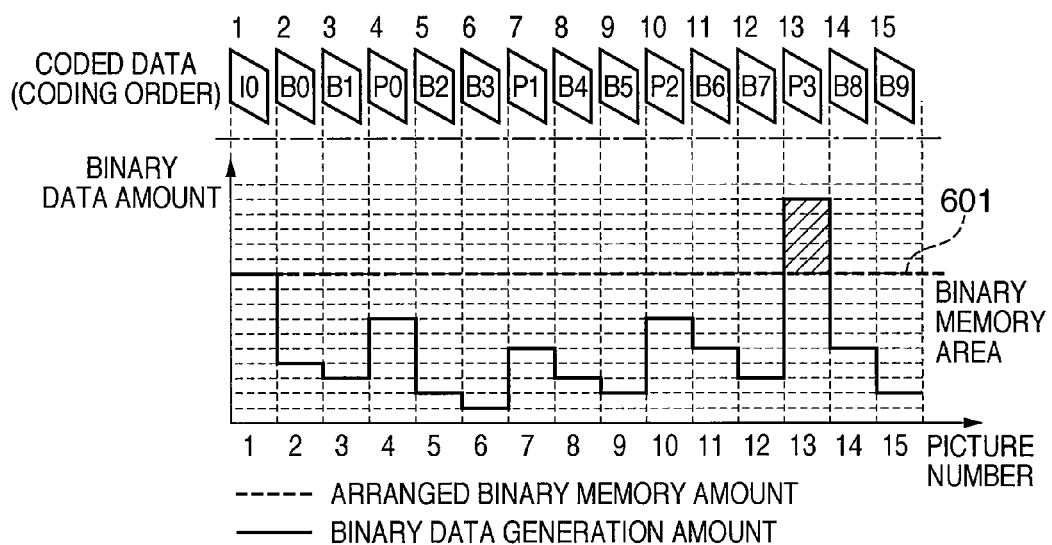
FIGS. 6A and 6B are graphs exemplifying another decoding processing using "bin_info SEI"
Figure 6B:
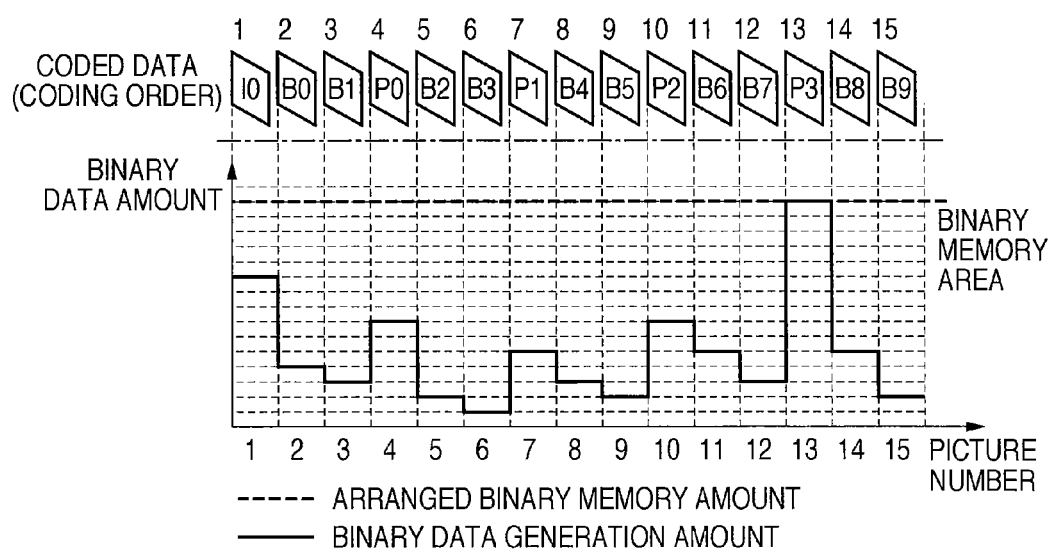

Also, assume that binary data of each picture in coded data changes as represented by a graph shown in FIG. 6A, and the decoding apparatus has a memory area of a size which is smaller than the upper limit defined by the standard, as indicated by a broken line 601 in the graph. In this case, the 13th picture may generate an enormous amount of binary data to overflow the binary memory area during execution of arithmetic decoding. Even in this case, a memory area capable of storing the binary data amount of the 13th picture can be assigned in advance based on a value obtained from "bin_info SEI", as shown in FIG. 6B. This can prevent overflow of the binary data memory area.

Needless to say, a memory area of an optimum value may be assigned for each picture, like the example shown in FIG. 5B. If no expanded memory area can be assigned, decoding of the 13th picture may be canceled in advance to execute error interpolation processing such as replacement with another picture. By thus preventing overflow of the binary memory, real-time decoding processing can be easily guaranteed.

The binary data amount affects not only the memory area but also the performance of arithmetic decoding processing. Arithmetic decoding in CABAC is generally known to require one clock cycle to process one bin of binary data. Thus, the performance of CABAC decoding processing depends on the clock frequency for driving the arithmetic decoding processing unit.

For example, considering a decoding apparatus capable of dynamically changing the driving clock frequency of the arithmetic decoding processing unit, the arithmetic decoding processing unit generally needs to be driven at a clock frequency at which the upper limit binary data amount defined by the standard can be decoded within a predetermined time. To do this, decoding is done using decoding auxiliary information according to the present invention, thereby obtaining the binary data generation amount before the start of arithmetic decoding. Performance necessary for arithmetic decoding processing can be calculated in advance. It suffices to drive the arithmetic decoding processing unit at a clock frequency optimum for each coded data, and reduction in power consumption can be expected.

Considering a decoding apparatus in which the driving clock frequency of the arithmetic decoding processing unit is fixed, it is sometimes difficult to satisfy the performance of arithmetic decoding processing for coded data which generates an enormous amount of binary data. To cope with such a case, the decoding apparatus may be designed to execute any recovery processing upon generation of binary data exceeding the performance of arithmetic decoding processing. However, in this case, the information whether or not binary data has exceeded the processing performance is also only obtained after arithmetic decoding. Hence, the time taken for arithmetic decoding processing may be wasted, and it becomes hard to assure real-time decoding processing. Even in this case, using decoding auxiliary information according to the present invention allows the obtainment of the binary data generation amount before the start of arithmetic decoding. A measure such as a skip of a picture that places a heavy burden on arithmetic decoding processing can be taken, easily assuring real-time decoding processing.

FIG. 9 is a block diagram showing a decoding apparatus 900 according to the first embodiment that can decode coded data generated by the above-described predictive coding apparatus 100. Referring to FIG. 9, a CPU 901 arranges, in a memory 906, work memory areas such as a picture data storage buffer and coded data storage buffer necessary for decoding processing. The CPU 901 controls respective processing units (to be described later) which build the decoding apparatus 900.

A clock generation unit 902 generates clock signals for driving the respective processing units which build the decoding apparatus, and supplies them to the respective processing units. Note that the clock frequency of a clock signal generated by the clock generation unit 902 can be controlled in a programmable manner by the CPU 901.

A coded data input unit 903 detects the start of an NAL unit from an input coded data stream based on the start code (0x000001), and determines the type of NAL unit. The NAL unit contains SPS (Sequence Parameter Set) as information about the sequence of input coded data, PPS (Picture Parameter Set) as information about the picture of coded data, SEI (Supplemental Enhancement Information) as additional information of coded data, and video coded data (slice). The coded data input unit 903 notifies the CPU 901 of bit stream information from the SPS, PPS, SEI, and slice header (SPS, PPS, SEI, and slice header will be called bit stream information at once) in the type-determined NAL unit. The coded data input unit 903 transmits slice data to an entropy decoding processing unit 904.

The entropy decoding processing unit 904 performs entropy decoding based on the bit stream information set by the CPU 901, and writes binary data as intermediate data in the memory 906.

A memory I/F 905 arbitrates memory access requests from the respective processing units, and controls read/write from/ in the memory 906.

The memory 906 stores binary data decoded by the entropy decoding processing unit 904 and picture data reconstructed by a predictive decoding processing unit 907. The memory 906 is shared between the respective processing units via the memory I/F 905.

The predictive decoding processing unit 907 is a processing unit which performs predictive decoding processing for each macroblock unit formed from 16×16 pixel blocks. The predictive decoding processing unit 907 includes a binary data decoding processing unit which decodes binary data, a predicted picture generation unit which generates a predicted picture by intra-frame prediction or inter-frame prediction, an inverse transformation processing unit which reconstructs a residual signal by inverse quantization and inverse orthogonal transformation, a picture decoding processing unit which reconstructs picture data by adding the predicted picture and residual signal, and a deblocking filter processing unit which performs deblocking filter processing for the decoded picture data.

First, the predictive decoding processing unit 907 reads out binary data from the memory 906 based on bit stream information set by the CPU 901, reconstructs a prediction mode, motion vector information, and the like necessary to generate an intra-frame predicted picture or inter-frame predicted picture necessary for predictive decoding, and generates a predicted picture based on a reference picture read out from the memory 906. Then, the predictive decoding processing unit 907 reconstructs a residual signal by inverse quantization and inverse orthogonal transformation, and adds the predicted picture and residual signal, reconstructing picture data. If necessary, the predictive decoding processing unit 907 performs deblocking filter processing for the reconstructed picture data, and writes the resultant picture data in the memory 906.

A video data output unit 908 reads out picture data reconstructed by the predictive decoding processing unit 907 from the memory 906 in a display order designated by the CPU 901. The video data output unit 908 adds vertical and horizontal sync signals to the picture data, outputting the picture data as video signals.

When the decoding apparatus 900 having the above arrangement receives coded data generated by the predictive coding apparatus 100, the CPU 901 can obtain a binary data generation amount by acquiring SEI containing binary data information, that is, "bin_info SEI". As described above, an optimum binary data buffer area can be assigned in the memory 906 before executing video decoding processing. Also, a clock signal with an optimum frequency can be generated for the clock generation unit 902.

[Second Embodiment]

A predictive coding apparatus in the second embodiment has the same arrangement as that of the predictive coding apparatus 100 in the first embodiment, and FIG. 1 will be applied. As a difference, a decoding auxiliary information generation method in a decoding auxiliary information generation unit 108b will be explained.

In the first embodiment, "bin_info SEI" is multiplexed for each picture. However, "bin_info SEI" is considered to be unnecessary when an actually generated binary data amount is smaller than a binary memory area assumed in the decoding apparatus. In general, a larger code amount is assigned to a reference picture than a non-reference picture. Thus, the reference picture is highly likely to generate a larger amount of binary data, and the binary data amount of the non-reference picture is considered to be small.

From this, when the binary data amount is equal to or larger than a predetermined threshold or when the picture to be coded is a reference picture, it is efficient to generate and multiplex "bin_info SEI" in terms of the code amount. The threshold for the binary data amount is set as "bin_thr" in advance. In addition, information indicating whether the picture to be coded is a reference picture is given by "ref_pic_flag" for binary data information input from an entropy coding unit 107 to a multiplexing unit 108. Also, information indicating the binary data amount is given as "bin_cur". When the binary data amount is equal to or larger than the predetermined threshold and the picture to be coded is a reference picture, "bin_info SEI" is generated.

Figure 7:
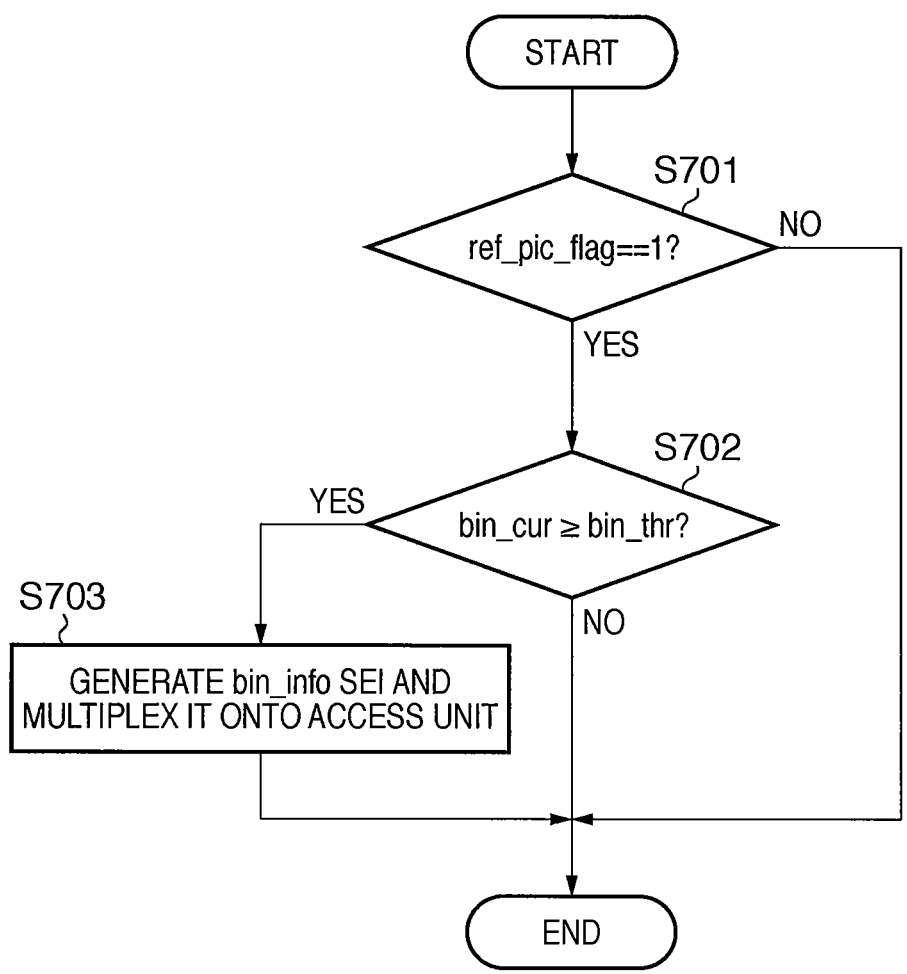
FIG. 7 is a flowchart showing a "bin_info SEI" generation method according to the second embodiment.

A "bin_info SEI" generation method in the second embodiment will be explained with reference to the flowchart of FIG. 7. The CPU serving as the multiplexing unit 108 can implement processing corresponding to the flowchart by executing the corresponding program (stored in the ROM or the like).

When the entropy coding unit 107 inputs binary data information to the multiplexing unit 108, the decoding auxiliary information generation unit 108b determines from the "ref_pic_flag" value in step S701 whether the picture to be coded is a reference picture. If the "ref_pic_flag" value is 1 and the picture to be coded is a reference picture ("YES" in step S701), the process shifts to step S702. In step S702, the decoding auxiliary information generation unit 108b compares the threshold "bin_thr" with the input binary data amount "bin_cur". If "bin_cur" is equal to or larger than "bin_thr" ("YES" in step S702), the decoding auxiliary information generation unit 108b generates "bin_info SEI" from the input binary data information in step S703. A stream generation unit 108c multiplexes the "bin_info SEI" onto an access unit. If the picture to be coded is not a reference picture ("NO" in step S701) or "bin_cur" is smaller than "bin_thr" ("NO" in step S702), the decoding auxiliary information generation unit 108b does not generate decoding auxiliary information.

In the above description, the input binary data amount is regarded as the data amount of one picture to be coded. However, the data amount may be compared for each slice. In this case, when the data amount of any slice exceeds the threshold, the decoding auxiliary information generation unit 108b generates a decoding auxiliary information.

In this fashion, according to the second embodiment, the decoding auxiliary information generation unit 108b determines whether the picture to be coded is a reference picture and determines the binary data amount. "bin_info SEI" is generated only for a picture to be coded which is a reference picture and has a binary data amount equal to or larger than the threshold. This can prevent an increase in data amount caused by redundant "bin_info SEI". In the second embodiment, the generation conditions dictate that the picture to be coded is a reference picture and the binary data amount is equal to or larger than the threshold. However, "bin_info SEI" may be generated if either condition is satisfied.

Figure 8A:
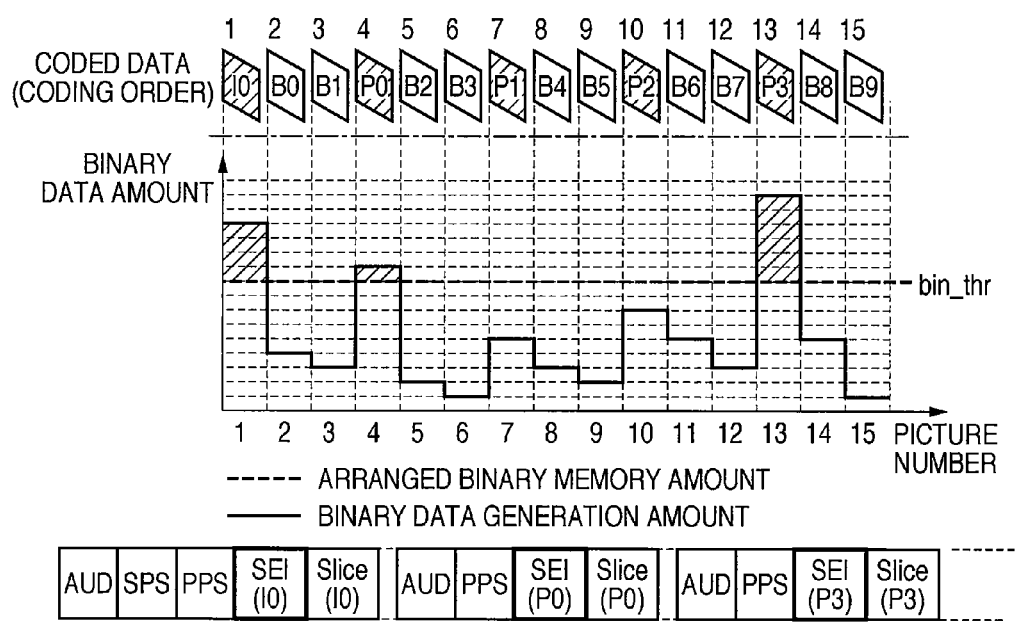
FIGS. 8A and 8B are graphs exemplifying still another decoding processing using "bin_info SEI"
Figure 8B:
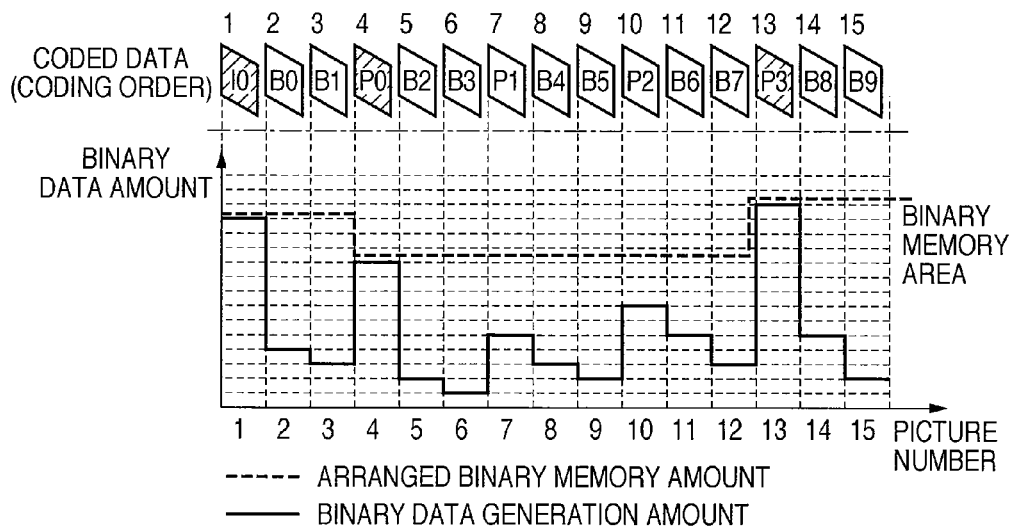

According to the second embodiment, even the decoding apparatus can determine that multiplexed "bin_info SEI" generates a critical binary data amount, and perform decoding processing. For example, assume that the binary data amount of each picture in coded data changes as represented by a graph shown in FIG. 8A. Hatched pictures are reference pictures, and the broken line in the graph indicates a threshold "bin_thr" set for the binary data amount. In this case, according to the method shown in the flowchart of FIG. 7, "bin_info SEI"s are multiplexed onto pictures I0, P0, and P3 which are reference pictures and have binary data greater than or equal to "bin_thr". In the decoding apparatus, a memory is arranged in accordance with the "bin_info SEI"s received for the I0, P0, and P3, as shown in FIG. 8B. The decoding apparatus can easily perform decoding without a shortage of the binary data area.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, which are the steps performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device such as a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-172727, filed Jul. 30, 2010, and 2011-141221, filed Jun. 24, 2011, which are hereby incorporated by reference herein in their entirety.

What is claimed is:

1. A coding apparatus which performs a predictive coding, comprising:

a first generating unit that generates a difference from a picture to be coded and a predicted picture;

a second generating unit that performs an orthogonal transformation and a quantization to generate quantized data from a difference generated by the first generating unit;

a converting unit that converts quantized data generated by the second generating unit into binary data;

a detection unit that uses binary data generated by the converting unit to detect an amount of binary data for each slice of one picture;

a coding unit that performs an arithmetically coding to generate coded data of one picture from binary data generated by the converting unit; and a third generating unit that generates a coded data stream that includes the coded data of one picture generated by the coding unit and information indicating the amount of binary data for each slice of one picture detected by the detection unit, wherein at least one of the first generating unit, the second generating unit, the converting unit, the detection unit, the coding unit, and the third generating unit is implemented by a hardware structure.

2. The coding apparatus according to claim 1, wherein the coded data stream further includes information indicating how many slices are in the picture to be coded.

3. The coding apparatus according to claim 1, wherein if the amount of binary data for each slice of one picture detected by the detection unit is larger than a threshold, the third generating unit multiplexes the coded data of one picture generated by the coding unit and the information indicating the amount of binary data for each slice of one picture detected by the detection unit to generate the coded data stream.

4. The coding apparatus according to claim 1, wherein if the picture to be coded is used as a reference picture for another picture to be coded, the third generating unit multiplexes the coded data of one picture generated by the coding unit and the information indicating the amount of binary data for each slice of one picture detected by the detection unit to generate the coded data stream.

5. The coding apparatus according to claim 1, wherein an access unit of a predetermined picture included in a start part of the coded data stream generated by the third generating unit includes the information indicating the amount of binary data for each slice of one picture detected by the detection unit and information indicating an amount of binary data for each slice of another picture detected by the detection unit.

6. A method for controlling a coding apparatus which performs a predictive coding, the method comprising:
    causing a first generating unit to generate a difference from a picture to be coded and a predicted picture;
    causing a second generating unit to perform an orthogonal transformation and a quantization to generate quantized data from a difference generated by the first generating unit;
    causing a converting unit to convert quantized data generated by the second generating unit into binary data;
    causing a detection unit to use binary data generated by the converting unit to detect an amount of binary data for each slice of one picture;
    causing a coding unit to perform an arithmetically coding to generate coded data of one picture from binary data generated by the converting unit; and
    causing a third generating unit to generate a coded data stream that includes the coded data of one picture generated by the coding unit and information indicating the amount of binary data for each slice of one picture detected by the detection unit.

7. A non-transitory storage medium that stores a program for causing a computer to execute a method for controlling a coding apparatus which performs a predictive coding, the method comprising:
    causing a first generating unit to generate a difference from a picture to be coded and a predicted picture;
    causing a second generating unit to perform an orthogonal transformation and a quantization to generate quantized data from a difference generated by the first generating unit;
    causing a converting unit to convert quantized data generated by the second generating unit into binary data;
    causing a detection unit to use binary data generated by the converting unit to detect an amount of binary data for each slice of one picture;
    causing a coding unit to perform an arithmetically coding to generate coded data of one picture from binary data generated by the converting unit; and
    causing a third generating unit to generate a coded data stream that includes the coded data of one picture generated by the coding unit and information indicating the amount of binary data for each slice of one picture detected by the detection unit.

8. The method according to claim 6, wherein the coded data stream further includes information indicating how many slices are in the picture to be coded.

9. The method according to claim 6, further comprising
    if the amount of binary data for each slice of one picture detected by the detection unit is larger than a threshold, causing the third generating unit to multiplex the coded data of one picture generated by the coding unit and the information indicating the amount of binary data for each slice of one picture detected by the detection unit to generate the coded data stream.

10. The method according to claim 6, further comprising
    if the picture to be coded is used as a reference picture for another picture to be coded, causing the third generating unit to multiplex the coded data of one picture generated by the coding unit and the information indicating the amount of binary data for each slice of one ib cture detected by the detection unit to generate the coded data stream.

11. The method according to claim 6, wherein an access unit of a predetermined picture included in a start part of the coded data stream generated by the third generating unit includes the information indicating the amount of binary data for each slice of one picture detected by the detection unit and information indicating an amount of binary data for each slice of another picture detected by the detection unit.

* * * * *